INVENTOR
JAMES R. POSTEMA
BY
Barnes, Kisselle, Raisch & Choate
ATTORNEYS

United States Patent Office 3,440,460
Patented Apr. 22, 1969

3,440,460
LAMINATED MOTOR STATOR WITH FORMED COILS AND SHADED POLES AND METHOD OF MAKING
James R. Postema, Owosso, Mich., assignor to Universal Electric Company, Owosso, Mich., a corporation of Michigan
Filed Aug. 30, 1967, Ser. No. 664,378
Int. Cl. H02k 15/02
U.S. Cl. 310—42                                 23 Claims

ABSTRACT OF THE DISCLOSURE

A formed coil motor stator comprising a plurality of laminations wherein each lamination comprises an annular body having circumferentially spaced coil receiving areas with intervening pole defining portions. As each lamination is stamped, a portion of the periphery of the lamination adjacent one edge of each coil receiving opening is spaced from the remainder of the lamination to define an access opening for a coil. A coil is inserted through the access opening with a portion of the coil exteriorly of the lamination and is moved to the circumferential end of the coil receiving area which is remote from the access opening. Each coil is then swung into straddling or encircling relation with the respective pole defining portion to bring the other end thereof within the access opening of the adjacent coil receiving area. The free ends of the spaced portions of the laminations are then deformed inwardly into engagement with the remainder of the laminations to close the coil access openings. Finally, the central portions of the coils are bent radially outwardly so that they are clear of the central opening of the laminations.

This invention relates to formed coil motors of the shaded pole type with two poles.

Background of the invention

Various techniques are presently used to form the stators of electric motors. In each technique, the stators are built up by assembling a plurality of laminations in stack relation by riveting, welding or other means. Each lamination includes a winding slot or coil receiving opening and the coils positioned therein must be insulated from the laminations by some form of insulation such as paper or resin. In one method of making a stator, previously formed coils of wire are telescoped over the poles into the winding areas by inserting through the space between the pole tips. Prior to insertion, the winding areas are insulated. After coil insertion, magnetic wedges or bridges are provided between the pole tips to close the large gap that was necessary to provide space for loading the coils. This method is difficult and expensive since the coils must be formed and stretched over the pole tips and thereafter reshaped about the poles. Moreover, the size of the coils is limited because the coil size would necessarily be more expensive from a material standpoint and would reduce the efficiency due to the large mean turn of the wire. Moreover, the use of magnetic wedges between the pole tips requires close control of the tolerance on the wedge receiving grooves formed in the pole tips and close control of the tolerances of the wedges themselves. Any change in the dimensions of the pole tips or wedges will result in improper fit and will also affect the distribution of magnetic flux. Furthermore, it is necessary that the wedges be firmly seated in the grooves of the pole tips to prevent vibration during operation of the motor. Experience with magnetic wedges has indicated a high percentage of rejects of stators due to damaging of the wire coils from contact with the wedges during insertion of the wedges.

In another method of assembling stators, the coils are wound about the pole defining portions which have been insulated with a suitable dielectric material. In this form, magnetic wedges are not needed because of the narrow opening between the pole tips which is made just wide enough to permit passage of the winding tool. In the making of two pole motors, a shroud must be provided about the laminations to hold the wire away from the opening of the laminations during winding and to impart proper form to the coil. The affixing and removal of the shroud requires considerable labor and produces little if any cost advantage over the first mentioned method.

In another method of making a motor, the stator core is made in two pieces and the coils are affixed about the poles of each piece and thereafter the pieces are brought together to form the assembled stator. This method also obviates the need of magnetic wedges but does necessitate the use of separate operations in the handling and assembling of two stacks of laminations.

Among the objects of the invention are to provide a field winding or stator for an electric motor which obviates the problems inherent in the use of magnetic wedges by eliminating the use of wedges; which incorporates features that reduce the cost of manufacture over the aforementioned methods; which can be manufactured quickly, easily, at low cost; which utilizes a novel pre-insulated wrap on the coils; and which is of particular advantage in the making of a two pole motor.

Summary

The formed coil motor shown herein comprises a plurality of laminations wherein each lamination comprises an annular body having intervening pole defining portions. As each lamination is stamped, a portion of the periphery of the lamination adjacent one edge of each coil receiving opening is spaced from the remainder of the lamination to define an access opening for a coil. A coil is inserted through the access opening with a portion of the coil exteriorly of the lamination and is moved to the circumferential end of the coil receiving area which is remote from the access opening. Each coil is then swung into straddling or encircling relation with the respective pole to bring the other end thereof within the access opening of the adjacent coil receiving area. The free ends of the spaced portions of the laminations are then deformed inwardly into engagement with the remainder of the laminations to close the coil access openings. Finally, the central portions of the coils are bent radially outwardly so that they are clear of the central opening of the laminations.

Description

Figure 4:
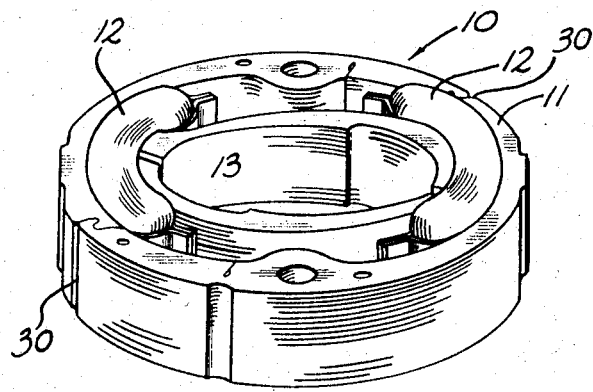
FIG. 4 is a perspective view of an assembled stator.

Referring to FIG. 4, the stator assembly 10 embodying the invention comprises a plurality of sheet metal laminations 11 that are assembled in a stack and have coils 12 positioned therein.

Figure 3:
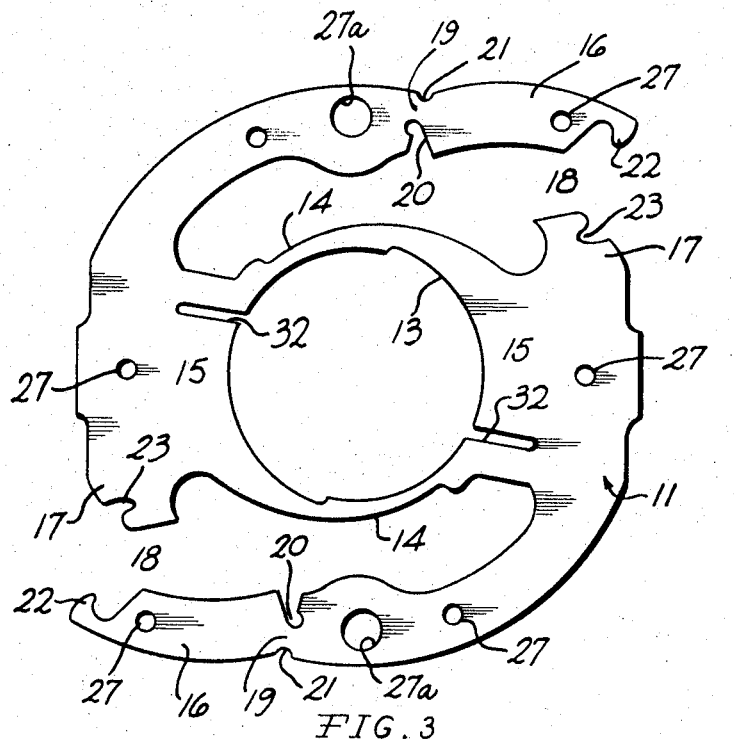
FIG. 3 is a plan view of a lamination utilized in making the stator embodying the invention.

As shown in FIG. 3, each lamination 11 comprises a generally annular body with a central rotor receiving opening 13, coil receiving slots or areas 14 separated by intervening pole forming portions 15. Each lamination includes a shaded pole slot 32. The stator is shown as being for a two pole motor.

As further shown in FIG. 3, a peripheral portion 16 adjacent one end of each coil receiving area 14 is spaced outwardly from the remaining portion 17 of the lamination to define an access opening 18 through which the coil can be inserted as presently described. Each free end 16 is separated from the remainder of the lamination by a neck portion 19 defined by an inwardly opening radial slot 20 that extends to the coil receiving area 14 and a notch 21 in the periphery of the lamination. The outermost end of each end portion 16 is formed with an inwardly extending tongue 22 that is adapted to be received in a generally complementary recess 23.

Figure 5:
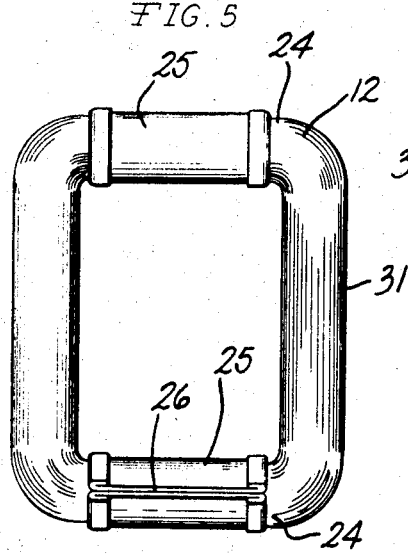
FIG. 5 is a plan view of a coil utilized in the invention.

As shown in FIG. 5, each coil 12 is generally rectangular and comprises a plurality of loops of wire. Opposed reaches 24 are provided with layers 25 of paper dielectric material such as insulation which have their ends 266 fixed as by riveting, gluing or other suitable means.

As further shown in FIG. 3, each lamination is provided with circumferentially spaced bolt holes 27a and rivet receiving holes 27. A plurality of laminations are assembled in a stack and rivets are inserted through the openings 27 to fix the laminations relative to one another. The stator assembly may be assembled by gluing, welding or other well-known methods.

Figure 1:
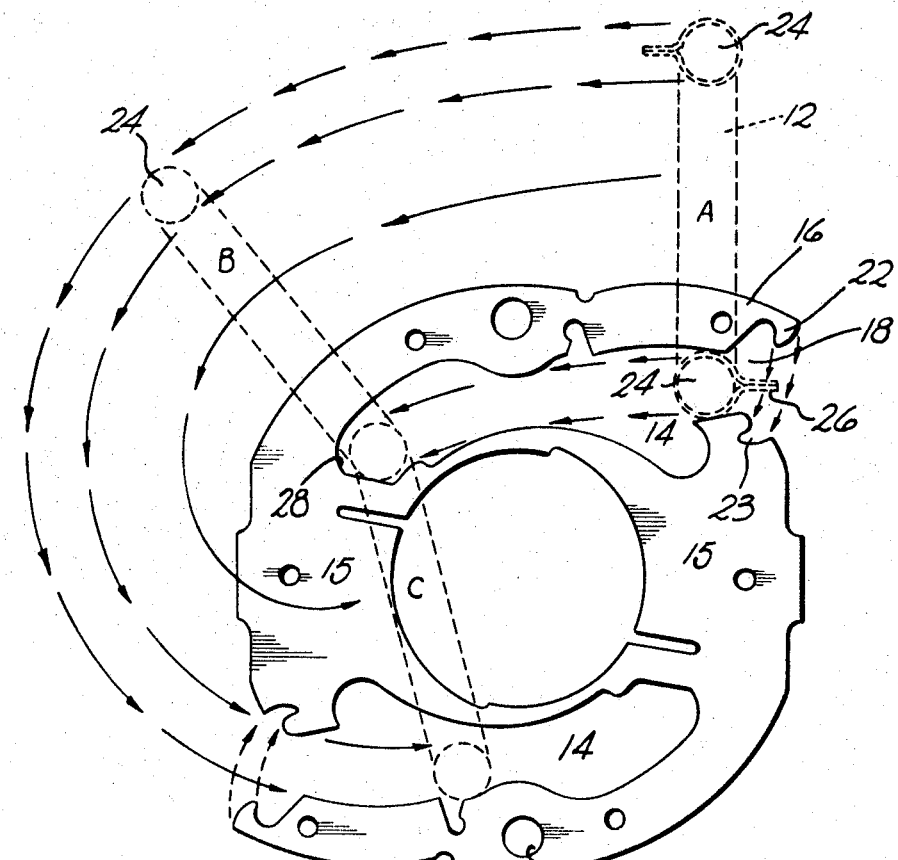
FIG. 1 is a partly diagrammatic plan view of an assembly of laminations showing the insertion of the coils.
Figure 2:
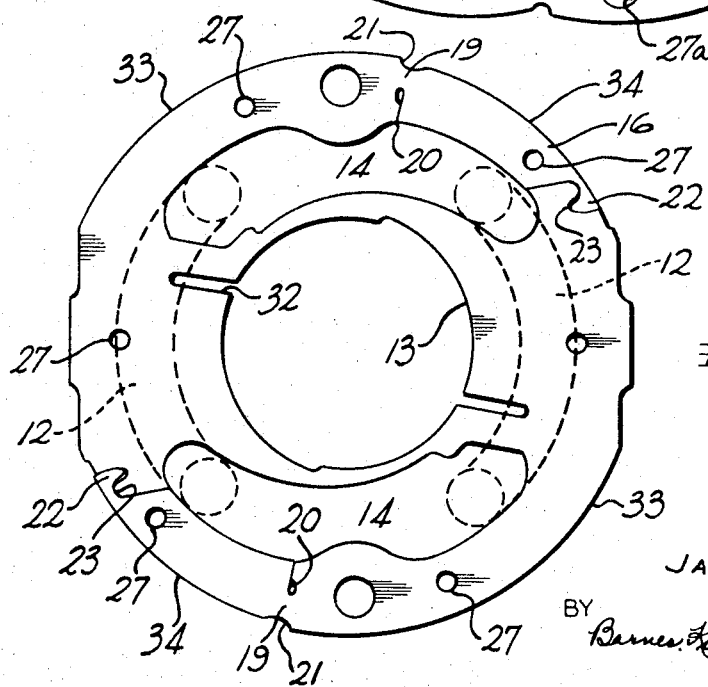
FIG. 2 is a plan view of the laminations after insertion of the coils, the coils being shown in broken lines.

As shown in FIG. 1, a coil 12 is then inserted through access opening 18 in each coil receiving area 14 with one reach 24 thereof within the area 14 and the other reach 24 exteriorly of the laminations, as shown in position A in FIG. 1. The one reach 24 of each coil 12 is moved to the end 28 of its respective coil receiving area 14 which is remote from its access opening 18 (position B). The coil 12 is then swung, counterclockwise as viewed in FIG. 1, to move the outermost reach 24 thereof through the access opening 18 of the adjacent coil receiving area 14 as shown at position C in FIG. 1. The free ends 16 are then moved inwardly to cause the tongues 22 to engage the recesses 23. The engagement with the adjacent portions of the laminations provides a good peripheral magnetic circuit therethrough. The resultant engagement is further insured by staking the joint as at 30. In the final assembly as shown in FIG. 2, the outer edge 33 of the portions of the laminations between the portion 16 and the pole defining portions 15 have a slightly greater radius than the outer edge 34 of the portions 16 so that a rigid accurate mounting surface is provided for engagement with the housing or casing of the electric motor.

Although the invention has been described in connection with a two pole motor wherein the advantages are greatest, it can be appreciated that the invention can also be applied to a motor having more than two poles. It has been found that a motor embodying this novel stator operates more efficiently in speed, power and temperature than a comparable motor.

I claim:

1. For use in an electric motor, a stator assembly comprising
a plurality of laminations in side-by-side relation,
each said lamination comprising an annular body,
said body having spaced coil receiving areas separated by intervening portions defining the poles of the stator,
each said lamination having a portion of the periphery thereof adjacent one end of each said coil receiving area providing access from the periphery to each said area for insertion of a coil,
a plurality of coils,
each said coil having one portion thereof inserted through said access opening into the coil receiving area and straddling the intervening pole forming portions with another portion thereof in the adjacent opening,
the portion of each lamination which is spaced at the periphery being engaged after insertion of the coil with the remainder of the lamination to close said coil receiving openings and provide a complete peripheral magnetic circuit.

2. The combination set forth in claim 1 including means for locking said free portions of each lamination to the remainder of the laminations.

3. The combination set forth in claim 2 wherein said last mentioned means includes a portion of each lamination deformed in the manner of staking.

4. The combination set forth in claim 1 wherein said free portions of said laminations are connected to the remainder of the laminations by a narrow neck portion.

5. The combination set forth in claim 4 wherein said narrow neck portions are each defined by a slot extending from a coil receiving area generally radially outwardly to provide the narrow neck portion.

6. The combination set forth in claim 1 wherein the free end of each said free portion of the lamination is provided with a tongue and the lamination is provided with a complementary recess for receiving said tongue.

7. The combination set forth in claim 6 wherein said tongue and recess have an interference fit.

8. The combination set forth in claim 1 including a plurality of axially aligned circumferentially spaced sets of openings in said laminations and rivets extending through said openings.

9. The combination set forth in claim 1 wherein each intervening pole forming portion includes a shaded pole slot extending radially inwardly to the periphery of the central opening of the laminations.

10. The combination set forth in claim 1 wherein said lamination comprises two pole defining portions.

11. The combination set forth in claim 1 wherein each said coil has an insulating wrap around the portion thereof adjacent the lamination.

12. The combination set forth in claim 11 wherein said insulating wrap comprises a sheet of insulating material wrapped around a portion of said coil and its ends juxtaposed and joined together.

13. For use in an electric motor, a lamination comprising
an annular body,
said body having spaced coil receiving areas separated by intervening portions defining the poles of the stator,
said lamination having a portion of the periphery thereof adjacent one end of each said coil receiving area providing access from the periphery to each said opening for insertion of one portion of a coil through said access opening into the coil receiving area and straddling the intervening pole forming portions with another portion thereof in the adjacent opening,
the portions of said lamination which are spaced at the periphery being adapted to be engaged after insertion of the coil with the remainder of the lamination to close said coil receiving openings and provide a complete peripheral magnetic circuit.

14. The combination set forth in claim 13 including means for locking said free portions of the lamination to the remainder of the lamination.

15. The combination set forth in claim 13 where said free portion of each lamination is connected to the remainder of the lamination by a narrow neck portion.

16. The combination set forth in claim 15 wherein said narrow neck portion is defined by a slot extending from a coil receiving opening generally radially outwardly to provide the narrow neck portion.

17. The combination set forth in claim 13 wherein the free end of each said free portion of the lamination is provided with a tongue and the lamination is provided with a complementary recess for receiving said tongue.

18. The combination set forth in claim 17 wherein said tongue and recess have an interference fit.

19. The combination set forth in claim 13 including a plurality of circumferentially spaced openings in said lamination for receiving rivets.

20. The combination set forth in claim 1 wherein each intervening pole forming portion includes a shaded pole slot extending radially inwardly to the periphery of the central opening of the laminations.

21. The combination set forth in claim 13 wherein said lamination comprises two pole defining portions.

22. The method of forming a stator assembly for an electric motor which comprises forming a plurality of laminations wherein each said lamination comprises an annular body having circumferentially spaced coil reeciving openings with a portion of the periphery of each lamination adjacent one end of each said opening being separated from the remainder of the lamination to provide an access opening to the coil receiving area, assembling said laminations in a stack, inserting a coil through the access opening of each said coil receiving area with one peripheral portion of the coil within the opening and the remainder of the coil exterior and encircling the portion of the lamination radially beyond the opening, moving each said coil to the circumferential end of its respective coil receiving area which is remote from the access opening, swinging each said coil to bring the portion thereof which is exterior of the lamination within the adjacent coil receiving opening through its access opening, thereafter moving the free portions of the laminations against the remainder of the laminations to close said coil receiving areas.

23. The method set forth in claim 22 including the step of deforming portions of the laminations to lock the free portions of the laminations with respect to the remainder of the laminations.

References Cited

UNITED STATES PATENTS

| 1,314,128 | 8/1919 | Croll | 310—259 |
| 1,314,132 | 8/1919 | Dorsey | 310—259 |
| 2,810,847 | 10/1957 | Tweedy | 310—254 |

FOREIGN PATENTS

| 539,051 | 12/1955 | Belgium. |
| 842,157 | 7/1960 | Great Britain. |

WARREN E. RAY, *Primary Examiner.*

U.S. Cl. X.R.

29—596; 310—217, 259